UNITED STATES PATENT OFFICE.

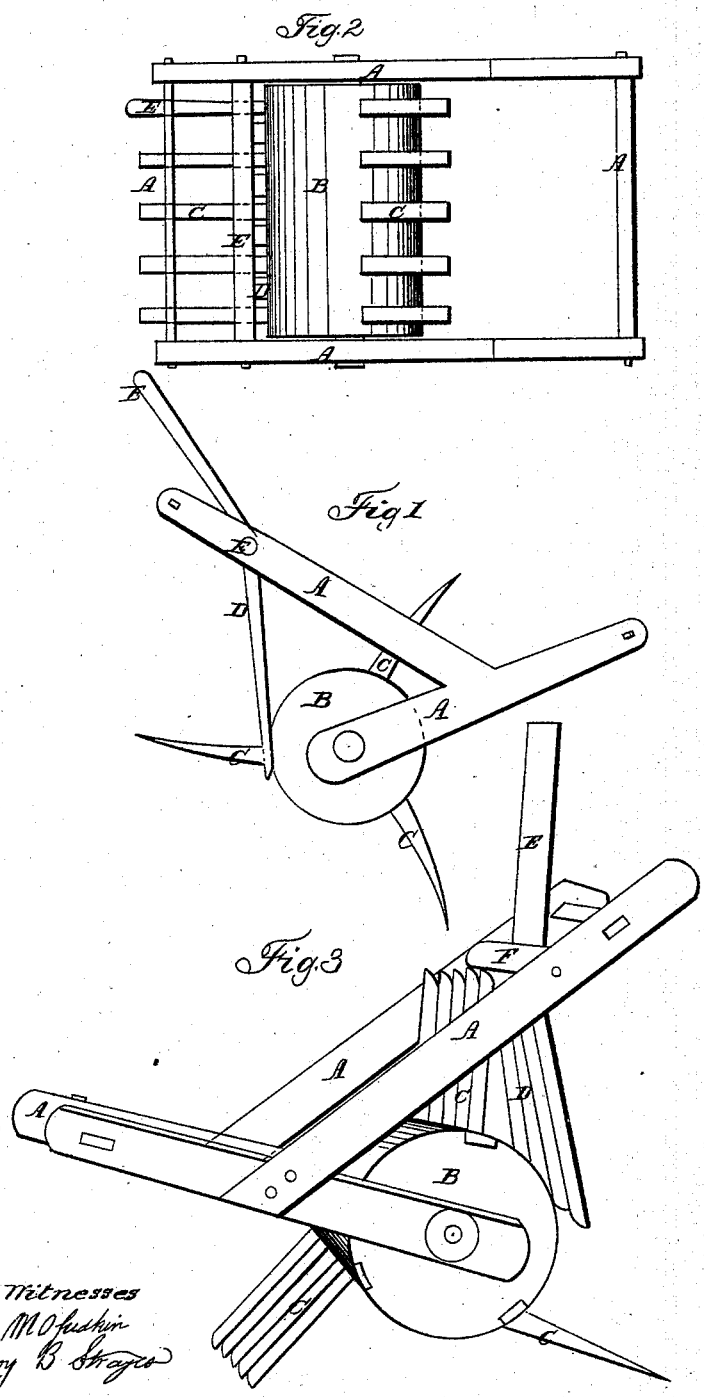

ROSWELL MARSH, OF STEUBENVILLE, OHIO.

IMPROVEMENT IN CULTIVATORS.

Specification forming part of Letters Patent No. 47,439, dated April 25, 1865.

*To all whom it may concern:*

Be it known that I, ROSWELL MARSH, of Steubenville, in the county of Jefferson and State of Ohio, have invented a new Machine for Breaking Up and Pulverizing the Earth for Agricultural Purposes; and I do hereby declare that the following is a full and exact description thereof, reference being had to the accompanying drawing, and to the letters of reference marked thereon.

The part represented by the letters A A A is a frame-work, the purpose of which is to attach the motive power, whatever it may be, to the machine, and to sustain a roller carrying a fork with long tines.

It consists of two shafts upon the ends of the axle which passes through the center of the cylinder B, and connected at their forward ends by a cross-bar, two other shafts inserted in them in advance of the axle, upright, but inclined back, also connected together at the top by a cross-bar. All these shafts must be long enough to admit of the forks in B to revolve.

B is a cylinder, of hard wood or iron, or both, with an axle passing through the center, of iron, and projecting far enough at the ends for the shafts to work upon the ends.

C C C are sets of forks, of steel spring tempered strongly, inserted in the cylinder B and curved.

In the two upright inclined shafts, at a sufficient elevation to let the forks C C C pass under it, is a roller, F, in which is inserted a fork, D, having long tines of hard wood or iron. In the roller is also a handle, E.

D E F constitute what I call the "clearing-fork."

The purpose of the cylinder is to carry the forks C C C, to hold them firmly in their places, to be large enough in diameter to be proportioned to the length of the fork-tines and heavy enough to drive them into the earth their full length.

I have estimated that a cylinder of hard solid timber, or of boiler-iron an inch thick filled in with wood two feet in diameter and two feet long, carrying twelve forks, the tines ten or twelve inches long and two inches apart in the clear, properly curved, would run about as heavy as a good-sized two-horse plow. The forks I estimate should be six inches apart on the cylinder, so that each one will break up six inches of soil in advance and the machine cut a furrow two feet wide.

The fork-tines should be of steel-spring tempered, large enough to sustain the strain upon them, terminating in a point, and so curved that they will penetrate the easiest, the pressure being on the point, and not on either side. Another effect of the curve of the tines will be that they will have passed partly under the soil they are to break up and pulverize, and each fork will make a vacuum under it, and thus facilitate the action of the next fork.

The purpose of the clearing-fork, the tines of which should be of hard strong wood or iron, long enough to rest against the cylinder without catching on it, and so arranged as to pass between the tines of the other forks, is to clear off whatever may clog or incumber the other forks. The tines are inserted in a roller in which is a handle to enable the driver by turning the roller to throw off whatever may incumber the forks. The frames may be lengthened, should they be found to require it, in any way deemed proper.

I have named the machine "Marsh's Rotary Cultivator."

What I claim as new, and desire to secure by Letters Patent, is—

The combination of the rotary cylinder with the digging-forks and the cleaner, substantially as described, and for the purpose set forth.

ROSWELL MARSH.

Witnesses:
B. P. DRUMER,
W. H. MOONEY.